Oct. 8, 1929.  J. H. LEHMAN  1,731,015
ROTARY VALVE
Filed June 26, 1925  4 Sheets-Sheet 2

Inventor
Joseph H Lehman
By his Attorneys

Oct. 8, 1929.    J. H. LEHMAN    1,731,015
ROTARY VALVE
Filed June 26, 1925    4 Sheets-Sheet 3

Inventor
Joseph H. Lehman
By his Attorneys

Patented Oct. 8, 1929

1,731,015

UNITED STATES PATENT OFFICE

JOSEPH H. LEHMAN, OF HASBROUCK HEIGHTS, NEW JERSEY, ASSIGNOR TO LEHMAN ROTARY VALVE CO., INC., OF NEW YORK, N. Y., A CORPORATION OF NEW YORK

ROTARY VALVE

Application filed June 26, 1925, Serial No. 39,638, and in Great Britain August 5, 1924.

This invention is an improvement in rotary valves, and more particularly valves for internal combustion engines in which the valves, valve casing, and other parts are subjected to wide temperature variation. All of the parts are at approximately the same temperature, namely that of the atmosphere, when the engine is first started, but after running a short time certain of the parts approximate the temperature of the cylinder head, which may be about 212° F.; others are kept below that temperature by the water jacket, radiating fins, or other cooling means, or by the incoming cool gases, while other parts may reach a very much higher temperature due to the more direct action thereon of the hot exhaust gases. The valve casing or housing is more easily cooled than the valve, and therefore the valve may reach a temperature very much higher than that of the casing. Defective lubrication and resulting friction may cause localized heating to a high temperature.

Efficient operation of an engine having a rotary valve requires that the valve must never be so loose as to permit leakage, and must never be so tight in its seat or bearing as to cause high friction or binding. If a rotary valve and its casing or housing have the same coefficient of expansion and the valve be heated to a higher temperature than the housing, as will ordinarily be the case, the greater expansion of the valve will cause it to bind at high temperature if it fitted properly at low temperature, while if the valve be of proper size to fit at high temperature it will be loose and permit objectionable leakage at low temperature. This applies particularly to the exhaust valve, and is due in part to the fact that the valve itself being subject to the direct action of the exhaust gases, tends to expand at a faster rate and to a greater extent than its bore, which is generally maintained at or near the temperature of the rest of the engine by the action of the cooling means. It is practically impossible to keep all parts of the valve and housing at the same temperature under operating conditions.

It is not practical to rely upon springs or other resilient means, yielding under the expansion pressure of the heated valve, to hold the valve to its seat, because of the widely varying fluid pressure conditions in the cylinder. If the springs act with sufficient force to hold the valve to its seat against the maximum gas pressure in the cylinder following the ignition under heavy load, said springs cause too great pressure and friction with consequent additional wear, under normal running conditions.

So far as concerns certain important features, the present invention is an improvement on the construction shown in my prior Patent No. 1,506,185, issued August 26th, 1924. In that patent I have shown and broadly claimed a construction in which a member of substantially semi-cylindrical form and of a material having a higher coefficient of expansion than the valve, has its end portions anchored and its intermediate portion serving to positively prevent the movement of the valve away from the desired positioning close to or in engagement with the portion of the casing wall having the main valve-controlled port, so as to prevent leakage at said port. This intermediate portion is rigid to resist fluid pressure exerted through the port on the valve, but is free to bend away from said wall on expansion by increase in temperature. By reason of the higher coefficient of expansion it will move to such an extent as will permit expansion of the valve by the accompanying increase in temperature of the latter, even though the member is heated to a very much lower temperature than the valve.

As one important feature of the present invention there are provided a plurality of the retainer members each in the form of a strap mounted at the bearings of the valve, the body portion of the valve being held in position solely by its spaced bearings. The rotary valve is preferably provided with roller bearings, the outer race rings of which are held in place by my expansible retainer members. When the valve and its bearings are heated, due to the action of the exhaust gases, the retainer members will receive a certain amount of the heat by heat transfer from the hot valve. The members are of such thickness and are so designed, so mounted and of such material, that each will expand or bow in a direction away from the valve seat to such an extent as to increase the diameter of the aperture at the bearing by an amount substantially equal to the increase in diameter of the part within said aperture. The side of the bearing and of the valve toward the valve seat has a substantially fixed position, so that upon expansion, the main movement is limited to the opposite side. Thus there is maintained a substantially uniform running fit or engagement of the valve and valve seat under all operating conditions, and variation in the diameter of the bearing aperture is mainly in one direction from a fixed point.

For instance, if the rotary valve be located horizontally above the cylinder head, it may have two or more roller bearings, and the aforesaid retainer or casing member or members may clamp the several outer race rings in place. The diameter of the valve bore and the race ring apertures will be variable to the maximum degree in a vertical direction, while the diameter in a horizontal direction will vary to a lesser degree, its expansion being limited to the expansion of the entire cylinder head at this point, which in turn is limited by the cooling system employed. The parts are therefore so made that when cold the horizontal diameter is greater than the diameter of the valve and its bearings, and greater than the vertical diameter. As the temperature increases, the valve and its bearings attain a higher temperature than the cylinder block, and the increase in diameter is greater than the increase in horizontal diameter of the valve chamber or aperture, thus reducing the side clearance. The vertical diameter of the bearing aperture expands to substantially the same amount as does the diameter of the bearing, thus firmly holding the bearing in place and maintaining the required running fit between the valve and its seat, so that leakage of the gases, as well as binding, is prevented under all operating conditions.

The words "horizontal" and "vertical" are used in relation sense only as the principle applies equally well no matter what the directional relation between the axis of the valve and the axis of the engine cylinder or crank shaft.

The expansible member may form both the bearing retainers and the upper section of the valve casing, or separate members or sections may be employed. Preferably the upper half of the valve block is formed of an aluminum alloy with thin walls and a water circulating chamber therein. The wall part adjacent to the upper side of the valve may move slightly under change in temperature, but it is not necessary that such wall have as close a running fit with the valve as the valve has with the opposite or cylinder port side of the casing. This is because said wall does not serve as a retainer against gas pressure thrust on the valve.

The members forming the upper part of the valve casing may be held in place by springs instead of being clamped with the center free to expand. This is permissible, as such casing would not be called upon to resist explosion pressure, and very light springs could be employed.

As a further important feature there is provided novel means for lubricating the valve and bearings therefor. The bearings may so support the valve that the main peripheral surface of the latter has a slight clearance at the side away from the cylinder port, and thus the lubricant may serve primarily as a liquid seal.

As a further feature the valve is preferably made of a nickel alloy which offers the minimum friction resistance, and does not score if lubrication fails.

As a further feature the valve is interiorly cooled by the passage of air axially therethrough, and this air thus heated is utilized for the forming of the explosive mixture. The air may be forced through the valve by the action of a fan at one end, and may be sucked from the other end by and through the carbureter to the intake manifold.

As a further feature the endwise expansion of the valve is from a fixed point toward the drive end, and the drive is of such a character as to yieldingly resist such endwise movement.

Various other features of importance will be pointed out hereinafter, or will be apparent from a study of the constructions illustrated in the accompanying drawings.

The invention is illustrated as applied to a four-cylinder, four-cycle internal combustion engine having cylinders 10, pistons 11, and a water jacket 12. The casting forming the cylinder block includes the cylinder head 13 presenting in its upper surface a substantially semi-cylindrical groove or channel forming approximately one-half of the bore or chamber for the rotary valve, and the lower portion of which may be considered as the valve seat. The head 13 has an inlet port 14, an exhaust port 15, and a cylinder port 16 for each cylinder. The cylinder port 16 extends from the valve seat to the working chamber, while the inlet and exhaust ports are on opposite sides thereof and connect to suitable manifolds. The working chamber of each cylinder may have a dome shaped upper end and the cylinder port 16 may be a slot extending across the diameter of the cylinder parallel to the axis of the valve.

Figure 9:
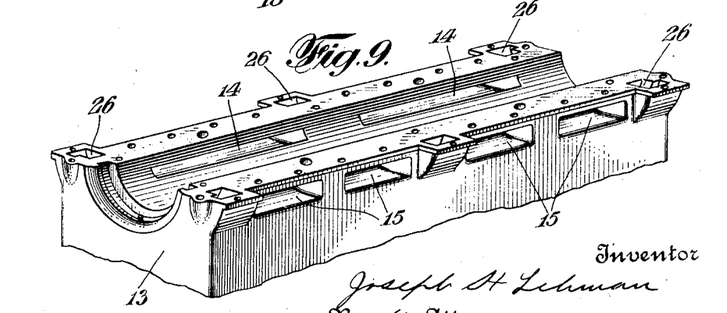
Fig. 9 is a perspective view of the cylinder head or lower half of the valve casing.

The rotary valve is of substantially tubular construction, the main portion of the outer peripheral wall 17 being cylindrical. Portions of the wall are so designed as to form a pair of recesses or passages 18 corresponding to each cylinder. Each recess or passage is of a length substantially equal to the length of the slot which forms the corresponding cylinder port 16, and is of such width that it can connect the port 16 with either the inlet port 14 or the exhaust port 15, but cannot directly connect the ports 14 and 15. The inlet ports 14 of two adjacent cylinders may be connected so as to form a single slot as indicated in Fig. 9, if desired.

Figure 2:
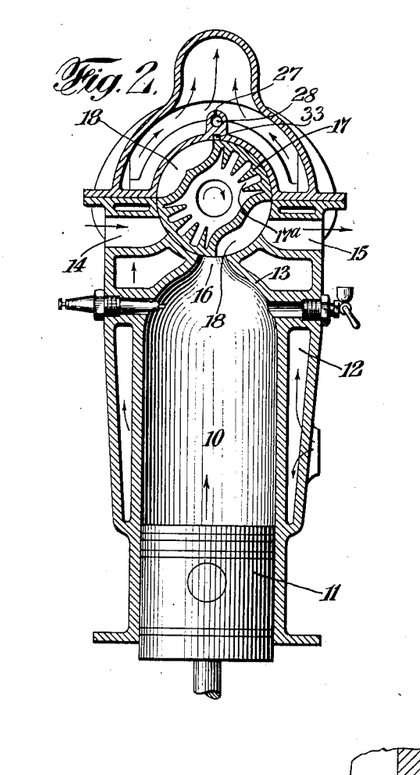
Figs. 2 and 3 are transverse sections on the lines 2—2 and 3—3 respectively of Fig. 1.

The valve as shown in Fig. 2 is intended to rotate clockwise, and is shown in the position which it occupies immediately after the opening of the exhaust port and just after the completion of the power stroke of the piston. The valve with two recesses or by-passes 18 for each cylinder should be driven by four-to-one gearing from the crank shaft. It will be evident that any other desired number of recesses or valve-by-passes might be provided with appropriate change in proportions and driving gear ratio. For instance if there be three for each cylinder the valve will be driven by six-to-one gearing. The recesses for the successive cylinders are spaced angularly to give the proper order of firing.

Figure 1:
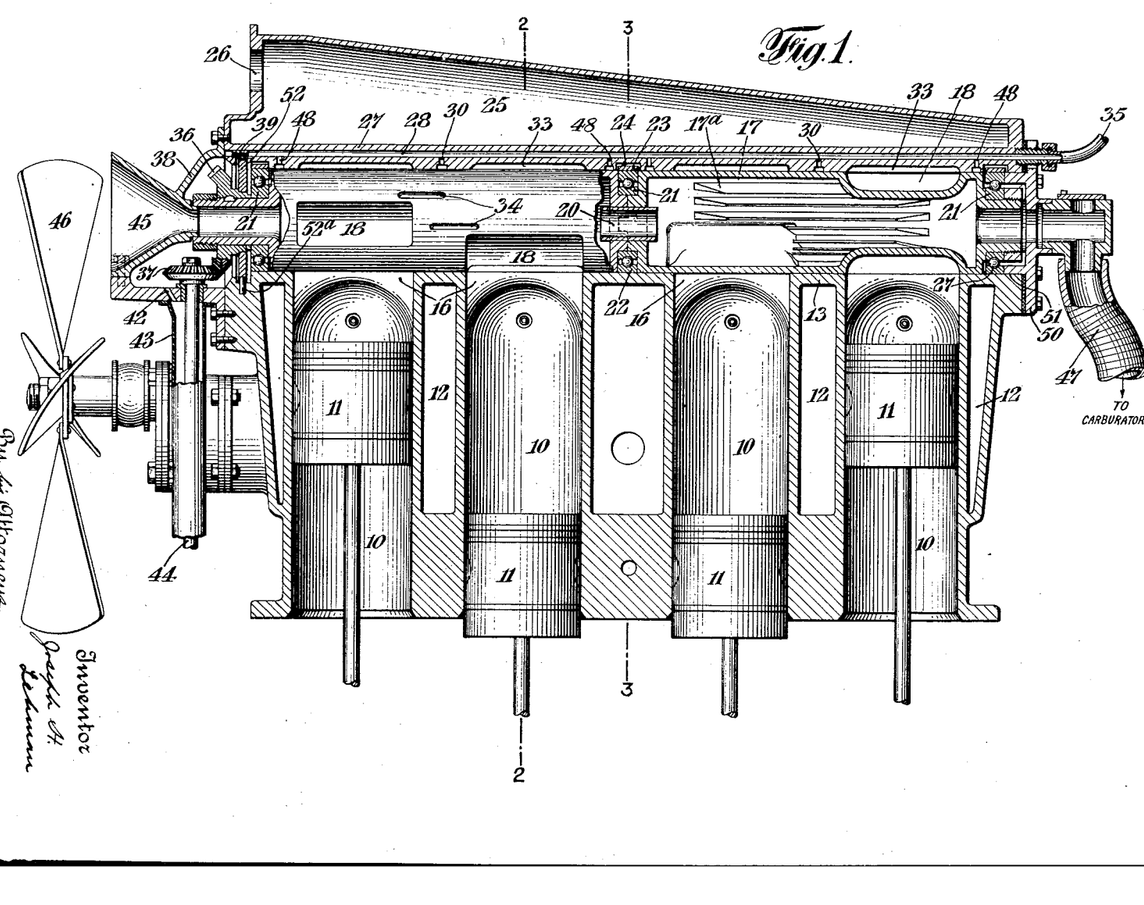
Fig. 1 is a central longitudinal section of a portion of an internal combustion engine embodying my invention.

As shown particularly in Fig. 1, the valve itself is made of two sections, each controlling the ports of two cylinders, the two sections being connected by interengaging lugs (indicated in dotted lines) which prevent any relative rotation of the sections. Alignment may be maintained and leakage between the two sections may be prevented by a sleeve or tube 20 driven into the end of one valve section, and having a close sliding fit in the other.

The valve is supported by roller bearings, preferably three in number, one at each end of the valve and one between the two valve sections. The valve thus has what may be termed three-point suspension. These roller bearings reduce friction and limit the wear on the valve and its seat. They also permit a very slight clearance between the valve and its seat which may be about .001 of an inch. The inner race rings 21 of the roller bearings may be mounted on portions of the valve of reduced diameter, and each outer race ring 22 may have its outer diameter substantially the same as that of the outside diameter of the valve.

The main feature of the present invention relates to the means employed for maintaining a tight running fit of the valve with the valve seat under varying temperature conditions. To accomplish this there are provided retainers, shoes, or clamping sections 23 which are of approximately semi-cylindrical form and so positioned opposite to the groove or channel in the cylinder head block as to form the balance of the support for the outer race rings 22 of the roller bearings. Each of the members 23 is preferably in the form of a strap with its ends clamped in position, but its intermediate portion, that is, the portion on the side diametrically opposite to the cylinder port 16 is free to move in a radial direction. Each member 23 as it varies in temperature will expand or contract, and as the ends are clamped, such expansion or contraction results in a variation in the curvature of the member, and a corresponding radial movement of the portion diametrically opposite to the seat for the bearing. Each member 23 is of such thickness and of such composition and coefficient of expansion, that when changes in running temperature cause variations in the diameter of the valve and of the race rings thereof, the accompanying changes in temperature of the member 23 due to heat transferred to the member from the valve through the balls or other rollers, will be such as to cause a radial movement of the center portion of said member through a distance substantially equal to the increase in diameter of the outer race ring. The straps will be heated to a less extent than the valve and should have a corresponding higher coefficient of expansion. They may be of magnalite, which is a copper-aluminum-magnesium alloy, or may be of other suitable composition, depending upon the efficiency of the valve cooling means and the difference in temperature range of the valve and straps. As shown, the clamping means include screw bolts.

As the valve should have a close running fit with the casing on the seat at the port 16, and as the expansion of the valve and its race rings is only a matter of thousandths of an inch, it is not possible to accurately illustrate in the drawings the clearances which are provided. In my prior patent above referred to, these clearances are illustrated on a very much enlarged scale. The clearance varies at the two opposite sides, but the members 23 will at all times maintain approximately their predetermined clamping tension on the upper side of the valve bearings, and the valve will always maintain its proper running fit on the seat at the port 16.

The upper half of the valve casing is preferably formed as a hollow casting with an inner, substantially cylindrical surface to approximately follow the contour of the valve. It is provided with grooves 24 which receive the valve bearing retainers and permit of a radial expansion of the intermediate portions of the later. The casting is provided with a water chamber 25 which may communicate with ports 26 in the upper surface of the cylinder block so that the water delivered to the cylinder jacket 12 may pass up through into the chamber 25 and thence through an outlet 26 to any suitable cooling means. The portions of the surface of the valve casing between the retainers 23 may be placed a few thousandths of an inch from the valve itself as the said casing is not relied upon as the means for holding the valve to its seat.

Figure 3:
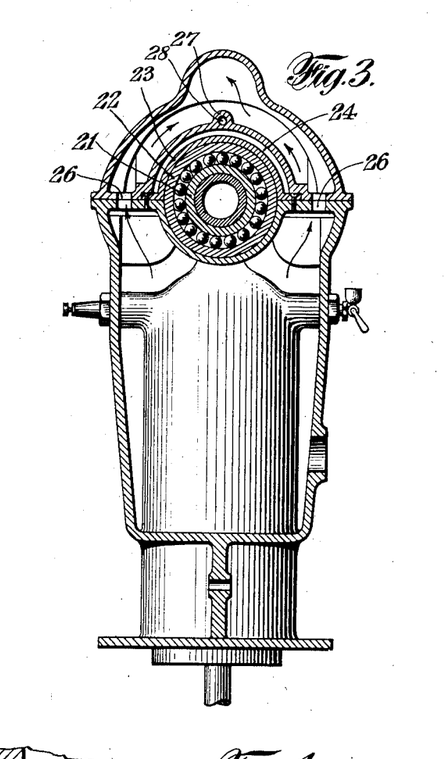
Figure 4:
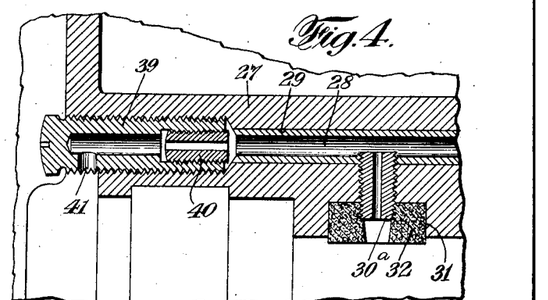
Fig. 4 is a sectional detail similar to a portion of Fig. 1, but on a very much larger scale.
Figure 5:
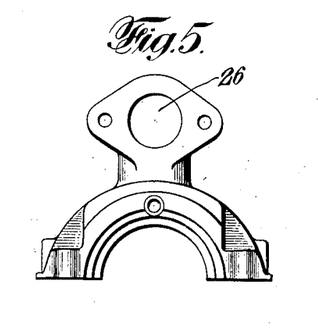
Fig. 5 is an end view of the valve cover.
Figure 6:
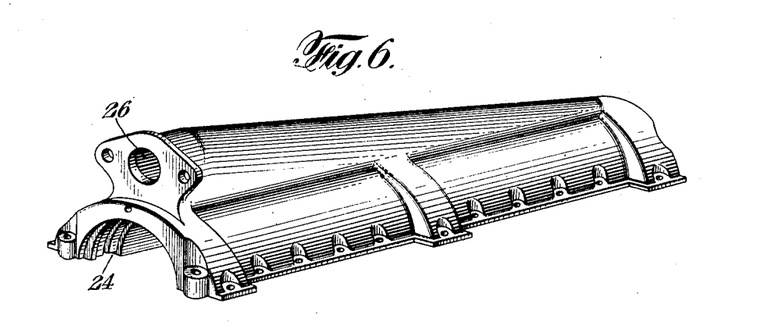
Fig. 6 is a perspective view of the valve cover.

As one important feature this valve casing is utilized as a portion of the means for distributing lubricant to the surface of the valve. The portion of the upper wall of the casing directly above the valve may be provided with a ridge 27 within which is a longitudinally extending oil passage 28. This is shown merely as a bored passage in Figs. 1, 2 and 3, because of the small scale of these views, but is preferably formed by casting a tube 29 in position as shown in Fig. 4, so as to avoid the difficulty of boring such a long, small diameter hole. At spaced points along the length of this oil delivery passage 28 there are provided outlets 30 to the valve chamber. These are preferably formed by drilling through the wall into the tube from the inner side of the valve casing, in which holes, plugs 30ª, as shown particularly in Fig. 4, may or may not be inserted. The hole through each plug, or the drilled hole if no plug is used, should be of the proper size in accordance with the desired amount of oil to be delivered at the desired oil pressure. The advantage of using a plug with the oil hole through it is that the plug may be removed and cleaned at any time in case the opening becomes clogged. Also, the plugs may be replaced by new ones having different sized holes, should occasion require. Preferably the plug or the drilled hole in the casing terminates in a chamber 31 formed in the inner surface of the valve casing, and within this chamber is placed an annular or solid washer or gasket 32 which is slightly expansible so that it may be compressed into the chamber and so that it will extend to a slight extent below the inner surface of the valve casing and be in contact with the valve surface at all expanded or contracted conditions of the parts. This prevents any vacuum or plenum which may exist in the valve casing at the upper side of the valve from acting upon the oil supply. The plugs and the pads forming the gaskets or washers each serve as flow-regulating means.

The oil outlets 30 may be two in number if the engine be a four-cylinder one, each outlet being disposed between the two sets of gas by-passes 18 of the corresponding valve section. Thus the outlets cannot directly communicate with these by-passes. As one means for distributing the oil along the surface of the valve the inner surface of the valve casing is provided with distributing grooves 33 extending lengthwise thereof and out of communication with the oil outlets. The outer surface of the valve is provided with short grooves 34 which are of such length that as they pass the outlets they will momentarily establish communication between said outlets and the grooves 33. Preferably each groove 34 is placed adjacent to the edge of a by-pass 18, which is the rear edge considered in respect to the direction of rotation of the valve. Thus after the groove 34 connects the oil outlet 30 with the groove 33 to admit a slight amount of oil to the latter, this oil will be distributed over the surface of the valve from one by-pass across to the next adjacent one. The grooves 33 preferably have wicking or packing therein to retain the oil, and such wicking or packing may or may not completely fill the groove. It may have a channel above the same, or cut or formed therein. Thus the oil may flow lengthwise of the groove but be delivered to the valve along the full length of the groove. The grooves 34 may be of any desired width to control the time interval during which oil is delivered to the grooves 33. If desired, the end of the groove 34 communicating with the oil port may have a short circumferentially extending section, or may be of greater width than the other end.

Oil is delivered to the passage 28 under pressure from any suitable source, as for instance an oil pipe 35. This is shown as being connected to the passage at the end of the engine opposite to that having the driving means for the valve. At the last mentioned end the passage 28 preferably has an outlet to such driving means. The pipe 35 instead of or in addition to delivering to the end of the passage 28, may have two or more branches leading through the water jacket and entering the passage 28 at points located along the length thereof, and symmetrically spaced in respect to the cylinders so as to provide a more nearly uniform oil pressure at the several holes 30. As shown particularly in Fig. 1, the valve is provided with a bevel gear 36 meshing with a pinion 37, said gear and pinion being mounted in a housing 38. The oil passage 28 terminates in this housing and is provided with means for restricting the outflow of oil, whereby the desired pressure may be maintained in the passage 28. As shown particularly in Fig. 4, there is provided a plug 39 having a passage therethrough in which is mounted a smaller plug 40 with an oil outlet of small diameter. The plug 39 may be removed for cleaning or replacement of the inner plug 40. The outlet 41 from the plug 39 leads to the housing 38 so that oil may be continuously delivered to this housing for the lubrication of the gearing. The excess oil delivered to the housing may escape through a port 42 and flow through a casing 43 encircling the drive shaft 44 and leading to the crank case.

The valve, as previously stated, is preferably hollow so that a cooling fluid may be continuously delivered therethrough. The inner surface of the chamber may be provided with radiating fins or flanges 17$^a$ to more effectively keep down the temperature of the valve. In order to equalize the temperature of the valve as far as possible, the fins preferably extend along only the outer or peripheral walls of those portions of the valve having the by-passes 18, and terminate at points spaced from the end of the valve or the ends of the sections of the valve if the valve be made up of two or more sections. These fins and the by-passes cause a restriction and more rapid movement of the cooling fluid along the hottest parts of the valve. Due to the angular spacing of the by-passes 18 for successive cylinders, some of the fins or flanges may extend alongside of the by-pass for one cylinder and terminate at the by-pass for the next cylinder, while other flanges or fins may extend alongside of the by-passes for two cylinders, as shown at the right of Fig. 1.

The gear housing 38 is provided with an air inlet funnel 45, the inner end of which registers with the interior passage through the hub portion at the end of the valve. Air is delivered through the interior of the valve both by the forward action of the vehicle if the engine be used on such a vehicle, but also by the action of the fan 46 which is employed with the ordinary automobile engine for cooling the radiator. At the opposite end of the valve, the air which has been heated in the valve may be delivered through a conduit 47 to the carbureter, or in some cases may be permitted to escape directly to the atmosphere.

The valve itself is preferably of antifriction metal such for instance as a nickel alloy, so that the minimum of lubricating is required. Ordinarily enough of the oil delivered to the surface of the valve will work along to the roller bearings to keep them lubricated, but these may be directly lubricated from the passage 28 if desired. I have shown oil outlets 48 adjacent to each of the roller bearings, but these may be omitted.

The valve is subject to expansion and contraction in an axial as well as in a radial direction. In my improved construction I preferably utilize the end thrust of the gearing on the valve to retain the latter in proper position. As shown, the valve block is provided with a closure 50 at the end opposite to the gearing, and this closure has a flange 51 which may serve as a stop for the adjacent roller bearing. The closure thus limits the endwise movement of this end of the valve. To prevent any possible gas leakage there is preferably a gasket disposed between the closure and the end of the valve block. The clearances shown at the right hand end of Fig. 1 are on a greatly enlarged scale.

The opposite end of the valve may move upon endwise expansion of the valve, this movement being permitted by a slight amount of play between the gears. At the same time the driving action of the gearing keeps the valve at all times against its stop at the other end, and returns the valve to initial position during contraction. The inner race ring of the roller bearing at the gear end is preferably clamped in place between a shoulder on the valve and the hub of the gear 6. Thus end thrust on the gear is directly transmitted to the valve. To form an air seal at this end and to protect the gears from dust and dirt, there is provided a collar 52 fitted in a groove and having means, such as a pin 52$^a$ to prevent rotation but permit axial movement through a distance equal to the maximum axial expansion of the valve.

Various changes may be made in the details of construction within the scope of the broad invention, as hereinafter claimed.

Figure 10:
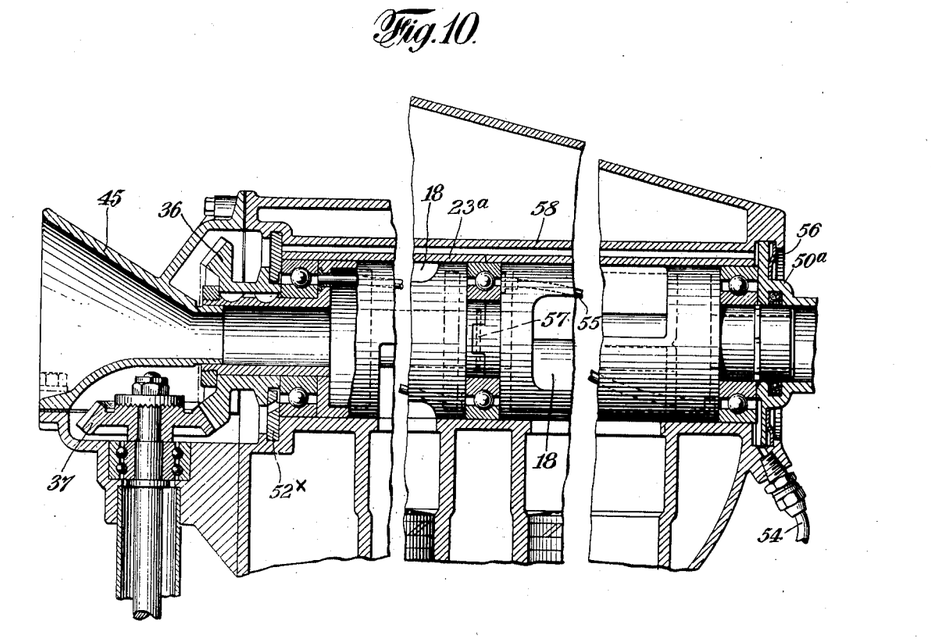
Fig. 10 is a section of a portion of an engine showing certain alternative forms.

Another arrangement for lubricating is shown in Fig. 10. Here the oil is delivered through a pipe 54 to a chamber at one end of one ball bearing, and may pass from this bearing through a helically disposed conduit 55 inside of the adjacent valve section to the ball space of the intermediate ball bearing. From here the oil may pass through a second pipe 55 to the ball bearing at the gearing end of the valve, and thence directly into the housing of the gearing. In the construction the balls are directly lubricated and a slight amount of oil may flow out at the sides of the outer race ring and work along the outer side of the valve for the lubrication of the latter. This lubrication system might be combined in one construction with that hereinbefore described, as one serves primarily for the bearings and the other primarily for the valve surface and to form a sealing film.

In the construction shown in Fig. 10 the end of the valve adjacent to the gearing is locked against endwise movement by a collar 52$^x$ which does not have any endwise play in the casing. As the valve expands axially, the end opposite to the gearing and the closure plate 50$^a$, moves against a spring 56. This spring should be of sufficient strength to move the valve back and prevent any separation of the sections when the valve contracts upon cooling. If desired the two valve sections may be locked together by a spring ring 57 snapped into place, and indicated in dotted lines.

In the construction shown in Fig. 10 I also make the part which serves directly as a valve cover integral with the race ring retainers. The members 23$^a$ which serve both functions are of semi-cylindrical form and extend along not only the outer race rings, but also the main body of the valve. There may be two sections which may abut and unite in retaining the outer race ring of the middle bearing. In this case the water jacket of the upper half of the valve has an inner wall 58 which is spaced from the two retainer sections 23$^a$ to permit expansion of the latter.

Figure 7:
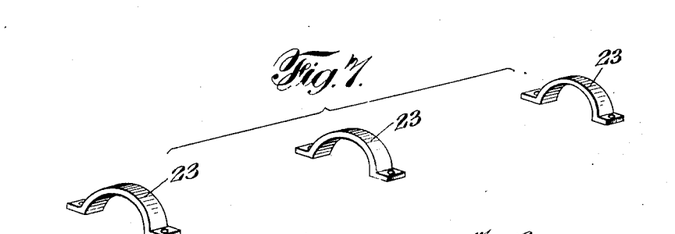
Fig. 7 is a perspective view of the valve retainers.
Figure 8:
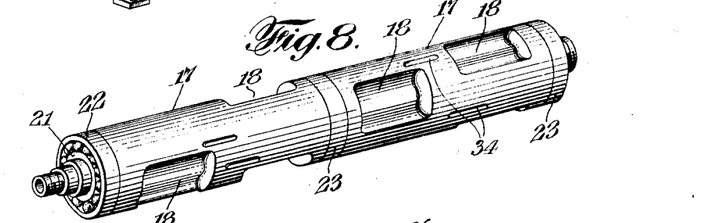
Fig. 8 is a perspective view of the valve.
Figures 11, 12:
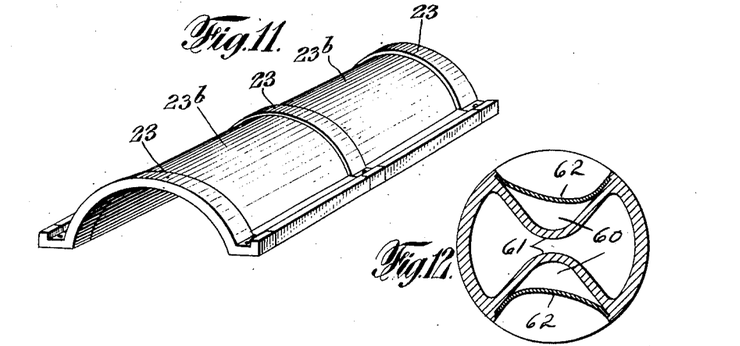
Fig. 11 is a perspective view of a further form of retainer or casing member.
Fig. 12 is a transverse section through a further form of valve by-passes.

In Fig. 11 I have shown a further form of the valve retainer. In this construction the retainer is formed of straps 23 which may be substantially identical with those shown in Fig. 7, and between these may be similar but thinner sections 23$^b$ which may be clamped in place at their edges and have their intermediate portions free to bend or bow upon expansion and contraction. The form shown in Fig. 11 is thus similar to that shown in Fig. 10, except that it is made up of a larger number of sections, and the sections which directly engage bearings are separate from those which engage the body portion of the valve. The construction of the retainer shown in Fig. 11 may in some cases have all five of the sections formed integral instead of being made up of separate sections, but the portions directly over the bearing may be thicker than the intermediate portions.

In Fig. 12 I have shown a further form of valve which has special advantages so far as concerns the cooling of the valve. The valve is cast with pockets 60 very much deeper than the desired passages, so that the walls 61 are spaced but a short distance apart. In each pocket is secured a thin sheet metal liner 62 which forms the inner wall of the passage and defines the shape thereof. Between the walls 61 and 62 are thus formed air chambers which prevent the direct action of the exhaust gases on walls 61 of the body of the valve. Thus the body of the valve does not become so highly heated and does not expand through as wide a range. The thin walls 62 do not store as much heat and are more effectively cooled by the incoming gas when the inlet port is open. Also the practical subdivision of the cooling passage lengthwise of the valve, into two parallel branches 64 at each pair of by-passes, causes the cooling fluid to act more effectively on the walls 61. The several pockets serve as deflectors for changing the direction of the cooling fluid during its course through the valve.

The construction shown in Figs. 10 and 11 is illustrated in the various foreign patents and applications identified in the accompanying oath.

The present invention involves an improvement on that shown and broadly claimed in my prior United States patent above referred to, so far as involves holding the valve to its seat, primarily in that the retaining members act on the bearings of the valve, and with or without action on the body of the valves. In many particulars the construction shown in Figs. 1 to 9 and Fig. 12 are improvements over those shown in said foreign patents and applications.

Having thus described my invention, what I claim as new and desire to secure by Letters Patent is:—

1. In combination, a valve casing having a seat portion, a rotary valve having spaced bearing portions and retainer members for said bearing portions serving to hold said valve to its seat, said members being rigid to resist pressure thereon by said valve, but a portion thereof being movable under temperature variation to permit expansion of said valve.

2. In combination, a valve casing having a seat portion, a rotary valve having spaced bearing portions, and retainer members for said bearing portions, each of said retainer members having an anchored part and a part movable under temperature variation.

3. In combination, a valve casing having a seat portion, a rotary valve having spaced bearing portions, and retainer members for said bearing portions, each of said retainer members having an anchored part and a part movable in a direction substantially radial of the valve and away from said seat upon increase in temperature, to permit expansion of the valve.

4. In combination, a valve casing having a seat portion, a rotary valve having spaced bearing portions and retaining straps for holding the bearing portions in position and resisting movement of the valve under fluid pressure, the terminals of said straps being anchored and the intermediate portions being free to bend under changes in temperature.

5. In combination, a valve casing having a seat portion provided with a port, a rotary valve having spaced bearing portions, and retaining straps for holding the bearing portions in position and resisting movement of the valve away from said seat portion under fluid pressure exerted through the port, the terminals of said straps being anchored and the intermediate portion being free to move radially in a direction away from said seat upon expansion of said bearing portions.

6. In combination a valve casing having a seat provided with a port, a rotary valve, roller bearings for said valve, means for holding the valve to its seat, said means including a plurality of straps extending along the sides of the roller bearing opposite to said seat, the ends of said straps being secured to said casing at opposite sides of the valve.

7. In combination a valve casing having a seat provided with a port, a rotary valve, roller bearings for said valve, means for holding the valve to its seat, said means including a plurality of straps extending along the sides of the roller bearing opposite to said seat, the ends of said straps being secured to said casing at opposite sides of the valve, and a separate valve cover for said valve and said straps and spaced radially from the intermediate portion of each strap.

8. In combination a valve casing, a rotary valve mounted therein, and a plurality of members each extending along substantially one-half the periphery of the valve, said members having portions independently movable radially upon change in temperature, but rigid against pressure thereon by the valve.

9. A valve casing having an aperture, a valve within said aperture and having roller bearings at opposite ends and retaining members engaging the outer race rings of said bearings, and having intermediate portions adapted to move radially upon changes in temperature of said members to vary the internal diameter of the casing at said bearing portions.

10. In combination a valve casing having a seat, a rotary valve mounted in said casing in engagement with said seat, a plurality of roller bearings spaced apart endwise of said valve, and each including an inner and an outer race ring, the outer race rings being of substantially the same outside diameter as said valve, and separate straps for engaging the outer race rings of said bearings and clamping them to said valve casing.

11. In combination a valve casing having a seat portion, a rotary valve, a plurality of spaced roller bearings for supporting said valve, and each including an inner and outer race ring, the outer race rings being of approximately the same diameter as the valve, and members for retaining said outer race rings in position, said members being rigid against pressure thereon by the valve, but having portions movable radially upon increase in temperature, whereby the running fit of said valve with its seat is maintained substantially constant during variations in temperature of the valve, bearings and retaining members.

12. In combination, a valve casing having a seat portion, a rotary valve engaging with said seat portion and having spaced roller bearings each including an outer non-rotatable race ring, retainer members for said race rings and a valve cover separate from said retainers having portions intermediate of said retainers and engaging with the valve between said race rings.

13. A valve casing having a port, a rotary valve for controlling said port, roller bearings for said valve and a pair of members for preventing the bodily movement of the valve away from the port, said members engaging with said roller bearings and being rigid to resist thrust thereon by the valve, but having portions movable radially on temperature change, and an outer casing spaced radially from said members so that said members may expand by heat transferred thereto from the valve.

14. A valve casing having a port, a rotary valve for controlling said port, roller bearings for said valve and a pair of members for preventing the bodily movement of the valve away from the port, said members engaging with said roller bearings and being rigid to resist thrust thereon by the valve, but having portions movable radially on temperature change, and an outer casing spaced radially from said members so that said members may expand by heat transferred thereto from the valve, and said outer casing having a wall portion disposed closely adjacent to the valve surface between said members.

15. An internal combustion engine having a valve casing member provided with a substantially semi-cylindrical groove with a cylinder port at the bottom of the groove and inlet and outlet ports upon opposite sides thereof, a substantially cylindrical tubular valve disposed within said groove and engaging with the bottom thereof at said cylinder port, said valve having its end portions of lesser diameter than the body portion, and the body portion provided with passages or by-passes for connecting said cylinder port with said exhaust port and said inlet port in succession during rotation of said valve, roller bearings encircling said end portions of said valve and each having an outer race ring of substantially the same diameter as said valve, and metal straps having their opposite ends secured to said valve casing member and their intermediate portions extending across said outer race rings for retaining the latter in said groove and preventing movement of said valve away from said cylinder port.

16. An internal combustion engine having a valve casing member provided with a substantially semi-cylindrical groove with a cylinder port at the bottom of the groove and inlet and outlet ports upon opposite sides thereof, a substantially cylindrical tubular valve disposed within said groove and engaging with the bottom thereof at said cylinder port, said valve having the body portion provided with passages or by-passes for connecting said cylinder port with said exhaust port and said inlet port in succession during rotation of said valve, roller bearings encircling the end portions of said valve, and metal straps having their opposite ends secured to said valve casing member and their intermediate portions extending across said outer race rings for retaining the latter in said groove and preventing movement of said valve away from said cylinder port.

17. An internal combustion engine having a valve casing member provided with a substantially semicylindrical groove with a cylinder port at the bottom of the groove and inlet and outlet ports upon opposite sides thereof, a substantially cylindrical tubular valve disposed within said groove and engaging with the bottom thereof at said cylinder port, said valve having the body portion provided with passages or by-passes for connecting said cylinder port with said exhaust port and said inlet port in succession during rotation of said valve, roller bearings encircling the end portions of said valve, metal straps having their opposite ends secured to said valve casing member and their intermediate portions extending across said outer race rings for retaining the latter in said groove and preventing movement of said valve away from said cylinder port, a valve cover having a substantially semi-cylindrical groove to receive the upper half of said valve and transverse grooves to receive the retaining straps.

18. An internal combustion engine having a valve casing member provided with a substantially semi-cylindrical groove, a substantially cylindrical valve disposed within said groove, roller bearings at the end portions of said valve and including inner and outer race rings, metal straps having their opposite ends secured to said casing member and their intermediate portions extending across said outer race rings for retaining the latter in position and preventing movement of said valve away from the bottom of said groove, and a valve cover having a substantially semi-cylindrical groove to receive the upper half of said valve.

19. In combination a rotary substantially cylindrical valve, a valve casing having a lubricant passage extending lengthwise thereof and provided with outlets at spaced points along the length thereof to the surface of the valve, and annular members encircling the inner ends of said outlets and engaging said valve and said casing.

20. In combination a rotary substantially cylindrical valve, a valve casing having a lubricant passage extending lengthwise thereof, a chamber in the surface of the valve casing and an oil hole connecting said passage and said chamber, and a compressible washer in said chamber and engaging with the surface of said valve, and through which oil is delivered to said surface.

21. In combination, a valve casing, a rotary valve mounted therein, means at one end of said valve for resisting end thrust on the valve, and bevel gearing at the opposite end of said valve for driving the latter, said gearing having sufficient play to permit axial expansion of the valve under changes in temperature.

22. A valve casing having an oil inlet port and a rotary valve having a plurality of grooves extending lengthwise thereof and communicating with said port in succession, and said casing having oil distributing grooves extending lengthwise thereof on the inner surface and out of communication with said port and intermittently communicating with the grooves of said valve.

23. In combination, a valve casing having a seat portion, a rotary valve engaging with said seat portion and having spaced roller bearings each including an outer non-rotatable race ring, retainer members for said race rings, and including portions movable radially upon increase in temperature to permit expansion of the race rings, and intermediate members engaging with the valve between said race rings.

Signed at New York, in the county of New York and State of New York, this 25th day of June, A. D. 1924.

JOSEPH H. LEHMAN.